Feb. 27, 1968    J. ZEMANEK, JR    3,371,313
METHOD AND APPARATUS FOR PRODUCING A REFLECTIVITY LOG
OF FORMATIONS TRAVERSED BY A BOREHOLE
Filed Feb. 3, 1966    2 Sheets-Sheet 1

Feb. 27, 1968  J. ZEMANEK, JR  3,371,313
METHOD AND APPARATUS FOR PRODUCING A REFLECTIVITY LOG
OF FORMATIONS TRAVERSED BY A BOREHOLE
Filed Feb. 3, 1966  2 Sheets-Sheet 2

United States Patent Office 3,371,313
Patented Feb. 27, 1968

3,371,313
METHOD AND APPARATUS FOR PRODUCING A REFLECTIVITY LOG OF FORMATIONS TRAVERSED BY A BOREHOLE
Joseph Zemanek, Jr., Dallas, Tex., assignor to Mobil Oil Corporation, a corporation of New York
Filed Feb. 3, 1966, Ser. No. 524,740
8 Claims. (Cl. 340—18)

ABSTRACT OF THE DISCLOSURE

The specification discloses a method of obtaining a log of the reflection coefficient of formations adjacent a borehole. A beam of ultrasonic pulses is directed toward the borehole wall in a circular scanning pattern and the direct reflections from the wall are received. The received signal is applied to a peak reading voltmeter circuit and then to an averaging circuit. The output of the averaging circuit is recorded on a strip chart recorder as a function of depth in the borehole.

---

This invention relates to acoustic logging of boreholes and, more particularly, to a method and apparatus for determining characteristic properties of formations adjacent a borehole by logging the amplitude of acoustic energy reflected from formations adjacent the borehole.

Presently in the art of logging boreholes, there are several acoustic devices which measure some parameter of the formations. Most of these employ the refraction of an acoustic pulse through the formations. Specifically in velocity logging, sonic pulses, emitted by an acoustic transmitter located in a logging tool, travel by refraction through the formations adjacent a borehole to be detected by an acoustic receiver spaced vertically from the transmitter. Then the travel time of the refracted pulse is measured and recorded as a log. From study of recordings made of this travel time proportional to the velocity of the formations, well log analysts are able to deduce the possibility of oil- or gas-bearing formations.

In another acoustic logging method, commonly referred to as amplitude logging, an acoustic pulse is refracted through the formations and the attenuation of the pulse is measured. Generally, both velocity and amplitude logging require a separation between the transmitter and the receiver of greater than one foot to get sufficient penetration of the refracted pulse into the formations. Often, thin interbeds less than one foot in width must be located to establish a possible producing zone.

Therefore, the primary purpose of this invention is to detect very thin, subsurface formations to allow the picking of these as possible producing zones.

Other purposes of this invention include the study of rock properties adjacent a borehole by analyzing the reflection coefficient of the rocks.

These purposes are accomplished in accordance with my invention in a method whereby ultrasonic energy is directed toward the inside surface of the walls of a borehole successively at a plurality of different radial angles. Direct reflections of the energy are received from the walls of the borehole, and a signal is generated which is representative of the average amplitude of the wall reflections received along the plurality of radial angles. The averaged signal may be analyzed as a measure of the reflectivity of the formations adjacent the borehole to determine the characteristic properties of the formations.

In a specific aspect of the invention, the peak amplitudes of the reflections are averaged over three complete scannings of the wall surface.

In another aspect of my invention, there is provided a system for carrying out the above method. The system includes a transducer assembly with a transmitter of a beam of repetitive, ultrasonic pulses and a receiver of ultrasonic pulses. A scanning means rotates the transducer assembly about the borehole axis so that the transmitter directs a pulsed acoustic beam toward the walls of the borehole, and the receiver detects the sonic pulses reflected directly from the walls. The transducer assembly is also moved along the length of the borehole so that the beam of the transmitter traces out a helical scanning pattern on the walls of the borehole. In response to the detected pulses, a signal is generated that is representative of the average amplitude of the pulses detected during at least one revolution of the transducer assembly. Finally, a strip chart recorder, or other means, records the averaged amplitude as a function of depth in the borehole.

The main advantage of the invention is that the effect of any local variations in the formations adjacent a borehole, such as cracks, fissures, washouts, and mud invasion, on the measurement of the reflectivity of the formations is reduced significantly.

For further purposes and advantages of my invention and a more detailed understanding of it, refer now to the following detailed description and accompanying drawings in which.

Figure 1:
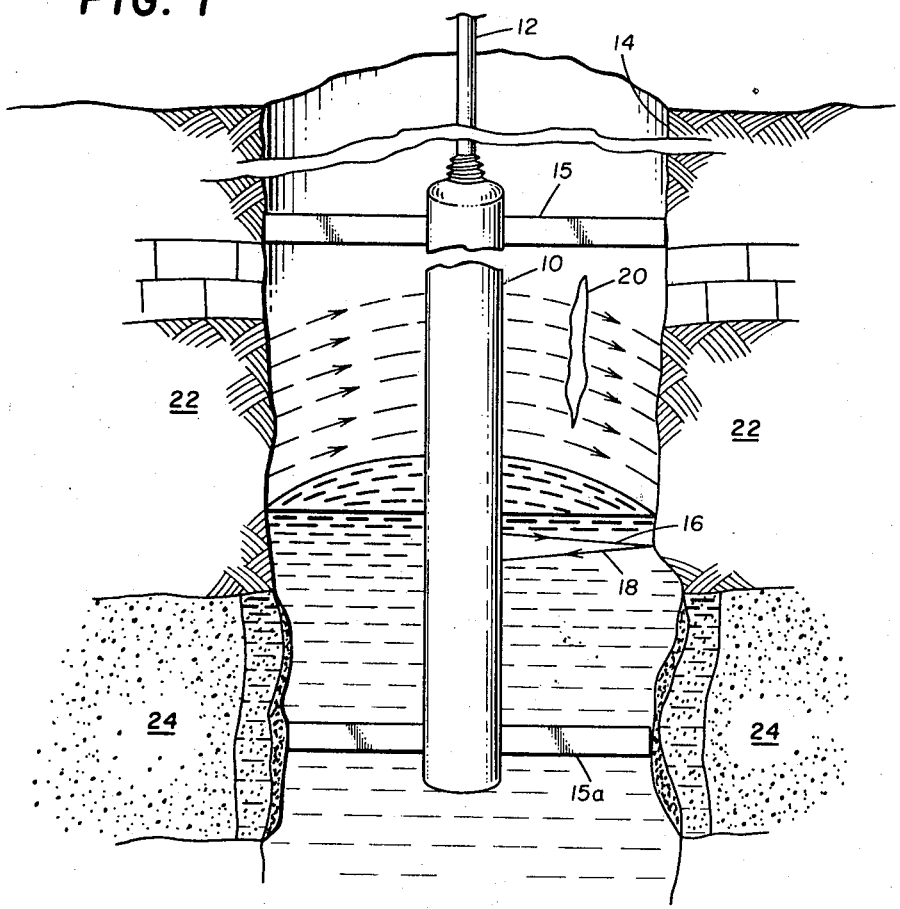
FIGURE 1 is a diagrammatic cross section of a borehole and an illustration of the direction of an ultrasonic beam against the walls of the borehole in accordance with the method of my invention.

Referring now to FIGURE 1, there will be described the method of my invention. As illustrated, a logging tool 10 is suspended by cable 12 into a mud-filled borehole 14. The logging tool 10 will preferably be centered in the borehole 14 by centralizers 15 and 15a, which may also include mud scrapers to remove the mud cake from the walls of the borehole. A pulsed, ultrasonic beam 16 is directed from the logging tool 10 toward the walls of borehole 14 in a circular scanning pattern about the inside of the borehole simultaneously with the movement of tool 10 along the borehole. The resulting scanning pattern is a helix. The direct reflections received from the walls of the borehole in the form of ray path 18 return to the logging tool 10 where signals are produced proportional to the amplitude of the received acoustic pulse. These received signals then are measured in amplitude and averaged over at least one helical revolution of the scanning transmitted beam to prevent local variations along the walls of borehole 14, such as vertical fracture 20, from interfering with an accurate measurement of the reflectivity of the formations.

The method of my invention allows the resolution of very thin beds. For example, where the limestone formation 22 has a thickness of only six inches, the helical scanning path of the transmitted beam 16 traverses it several times and an average reflection signal is obtained for the limestone formation.

Preferably, in practicing my invention, the peak frequency of the pulses in the transmitted beam 16 will be about two megacycles per second. When the term "ultrasonic" is used, it indicates generally frequencies of above 20 kilocycles per second. It is preferable that the transmitted acoustic beam 16 be directed substantially perpendicular to the walls of the borehole. Preferably, the angle between a normal to the borehole wall and the transmitted beam 16 is less than 20°. It has been found that where an acoustic beam is transmitted substantially perpendicular to the walls of a borehole, the return reflection is most representative of the reflectivity of the adjacent formation.

Figure 2:
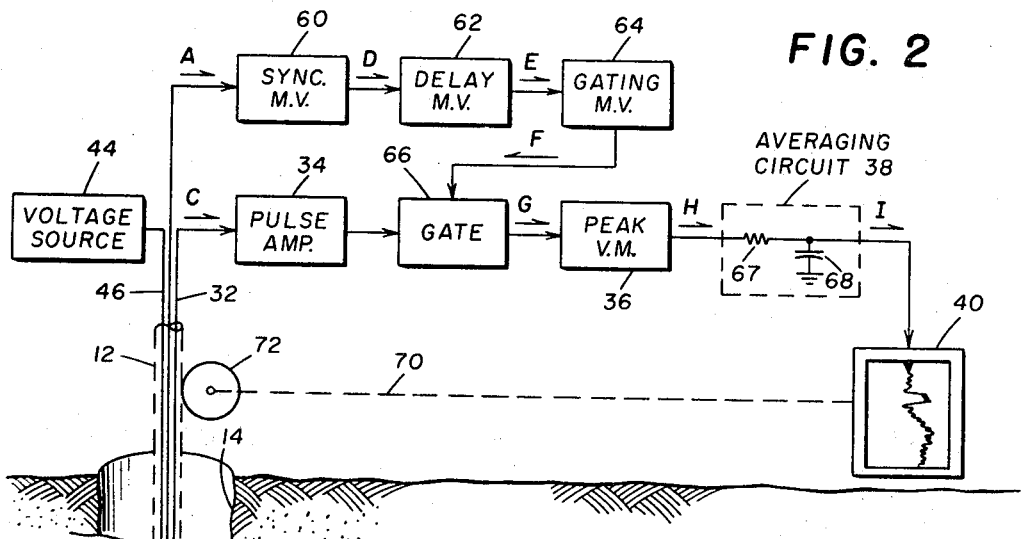
FIGURE 2 is a system for carrying out the method of my invention, including a block schematic of circuit components and a diagrammatic representation of a logging tool in a borehole.

It will be apparent that there are several means for carrying out the method of my invention, but one preferred system is shown in FIGURE 2. Therein, the logging tool 10 is illustrated in phantom to allow the components of the tool to be illustrated diagrammatically, but it will be understood that they will be suitably contained within the housing of the tool.

Briefly, the operation of the system is as follows. A motor 26 revolves a transmitter T about the logging tool 10 so that a beam 16 of pulsed, ultrasonic energy is scanned about the walls of borehole 14. Motor 26 also rotates a receiver R which detects the reflected acoustic pulse beam 18 and converts it into a series of electrical pulses for amplification by the signal amplifier 28. The high frequency, electrical pulses are then converted to lower frequencies in detector 30 and transmitted uphole via conductor 32 for further amplification by the pulse amplifier 34. In response to the pulses from the pulse amplifier 34, a peak voltmeter circuit 36 generates a signal representative of the peak amplitude of the pulses. An averaging or integrator circuit 38 converts the peak amplitude signal to an average signal for all the pulses received during at least one revolution of the transmitter T. The output of the averaging circuit 38 is applied to a strip chart recorder 40 which produces a log in correlation with the depth of the logging tool 10 in the borehole.

A voltage source 44 sends operating power downhole via a conductor 46 to suitable power supplies (not shown) in the logging tool 10 for providing the power at various voltage levels for motor 26, pulser circuit 46, and signal amplifier 28. Motor 26 rotates, at a constant rate, a transducer assembly, including transmitter T and receiver R, by way of mechanical connection 48.

Figure 3:
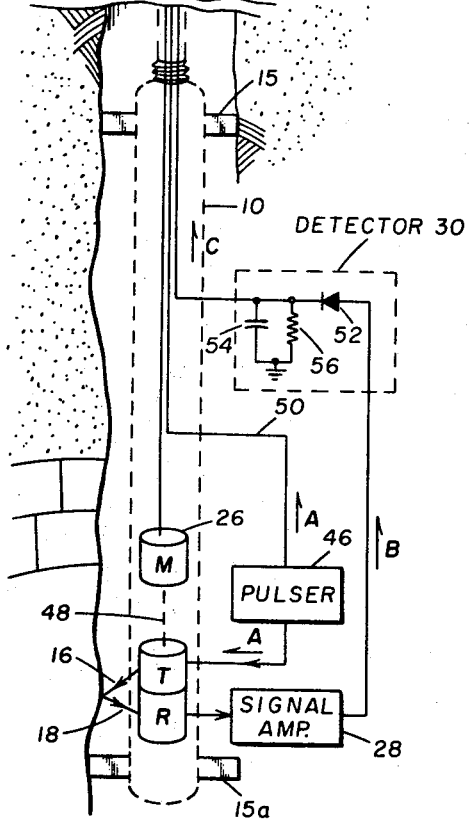
FIGURE 3 is a series of waveforms representative of the signals appearing at the indicated points in the circuit of FIGURE 2.
Figure 3:
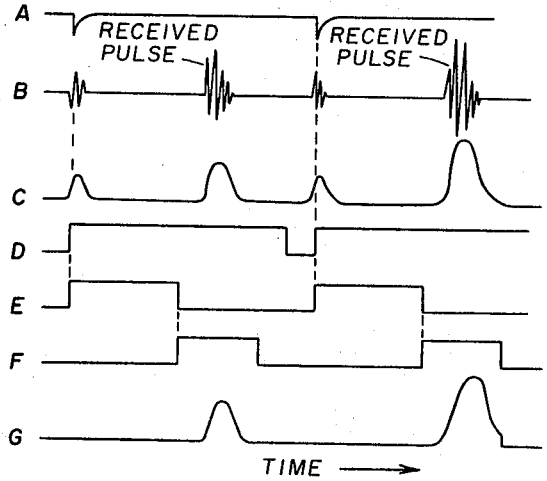

As the transmitter T revolves about borehole, the pulser circuit 46 generates a series of excitation pulses to drive the transmitter T to produce a series of acoustic pulses directed in a focused beam substantially perpendicular to the walls of borehole 14. Each time the pulser circuit 46 generates an excitation pulse, it also generates a sync pulse, as indicated by waveform A (FIGURE 3), for transmission uphole via conductor 50 to certain noise-protection circuitry which will be described later. As the focused beam of pulses 16 scans in a circular direction about the borehole, the logging tool 10 is moved along the length of the borehole by a hoist mechanism, not shown. Due to the varying reflection characteristics of the formations adjacent borehole 14, different amplitudes of reflections are returned in beam 18 to the receiver R. The receiver R converts each acoustic pulse in beam 18 to a representative electrical pulse. The output of the receiver R may be seen as waveform B.

Ordinary logging cables are not suitable for transmission of the high frequency, received signals to the surface. The envelope of the received signals is a considerably lower frequency. This signal can be transmitted to the surface over a conventional logging cable.

Therefore, after being amplified in signal amplifier 28, the received pulse is then detected in detector 30 before transmission uphole via conductor 32. The detector 30 passes on to conductor 32 only the envelope, as shown in waveform C, of the output of receiver R. The detector 30 may be of conventional type as used in ordinary amplitude-modulated radio receivers and includes a diode 52 and a parallel-connected capacitor 54 and resistor 56 connected from cathode to ground.

Whenever the pulser 46 generates an excitation pulse, a portion of this pulse cross-feeds into the receiver channel. Also, whenever a sync pulse A is generated by pulser 46 and sent uphole, a portion of the electrical sync pulse cross-feeds into the receiver line of conductor 32. Therefore, the cross-feed would upset the measurement of the amplitude of the received signals.

To eliminate the cross-feed problem, noise-protection circuitry is provided including a sync monostable-multivibrator 60. Each time a sync pulse A is received by the sync multivibrator 60, it triggers into its unstable state for an output, as indicated by waveform D, for a time period almost as long as the repetition rate between transmitted ultrasonic pulses. Therefore, the probability that spurious noise will trigger the noise-protection circuitry is reduced. At the same time that the output waveform D of the sync multivibrator goes positive, a delay monostable multivibrator 62 responds to the positive-going leading edge of waveform D and triggers into its unstable state for a time period, as indicated by waveform E, until just prior to the expected arrival time of the received pulse. As the trailing edge of the delay multivibrator waveform E goes negative, a gating monostable multivibrator 64 responds and triggers into its unstable state for the generation of a positive-going output waveform F. The gating multivibrator 64 is adjusted to give an output waveform F to control passage of the received signal or pulse. Upon occurrence of waveform F, a gating circuit 66 opens to allow passage therethrough of the signal from the pulse amplifier 34 to the peak-reading voltmeter 36. Therefore, only the envelope of the received signal, as indicated by waveform G, passes on to the peak-reading voltmeter 36. The peak-reading voltmeter circuit 36 measures the peak amplitude of each of the received pulses and passes the peak voltage on to the averaging circuit 38 which includes a resistor 67 and a capacitor 68. The peak voltmeter circuit may be a conventional circuit known to those skilled in the art, or it may be a commercially available vacuum tube voltmeter whose meter circuit is tapped for output to the averaging circuit 38.

Figure 4:
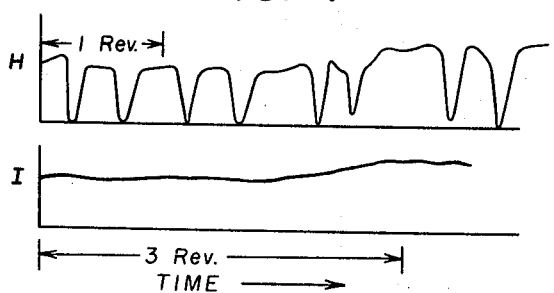
FIGURE 4 illustrates a pair of waveforms obtained over several cycles of revolution of the transducer assembly and appearing at the indicated points in the circuit of FIGURE 2.

For a better understanding of the purpose of the averaging process, refer now also to FIGURE 4 where the time waveform H indicates the output of the peak voltmeter 36 during the time of several revolutions of the transmitter T. As shown, the amplitude of the voltage H has variations and several notches which could be due, for example, to the presence of a fracture in the borehole. The averaging circuit 38 ignores these notches or sharp variations and produces an output waveform I which is the average voltage from the peak voltmeter 36 over a period of time equal to at least one helical revolution of the transmitted acoustic beam 16.

The averaged receiver signal I is then passed on to the strip chart recorder 40 where the recording pen traces out a log which varies in amplitude of excursion along the paper of the recorder in proportion to the averaged received signal. The paper on strip chart recorder 40 is driven past the recording pen at a rate proportional to the movement of the logging tool 10 in the borehole by an electromechanical link 70 which is connected to the sheave 72 over which the logging cable 12 passes.

In carrying out the method of my invention, the logging tool 10 (FIGURE 2) may be moved along the borehole 14 at a rate of about 15 feet per minute. The rotation rate of the transmitter T and receiver R may be about three revolutions per second. The peak frequency of the pulses in the transmitted beam may be about two megacycles per second, and the repetition rate of the pulses may be about two kilocycles per second. With the above parameters, the averaging time may be about three revolutions, that is, the averaging circuit 38 is so constructed to average the output of the peak-reading voltmeter 36 over a time period equal to three revolutions of the transmitter T.

To produce an averaging over three revolutions, the illustrated averaging circuit 38 should have an RC constant that is about three times the period of revolution of the transducer assembly. In the specific cases of parameters given in the example above, resistor 67 may be 10,000 ohms and capacitor 68 may be 100 microfarads for a strip chart recorder with a nominal input resistance of one megohm.

Figure 5:
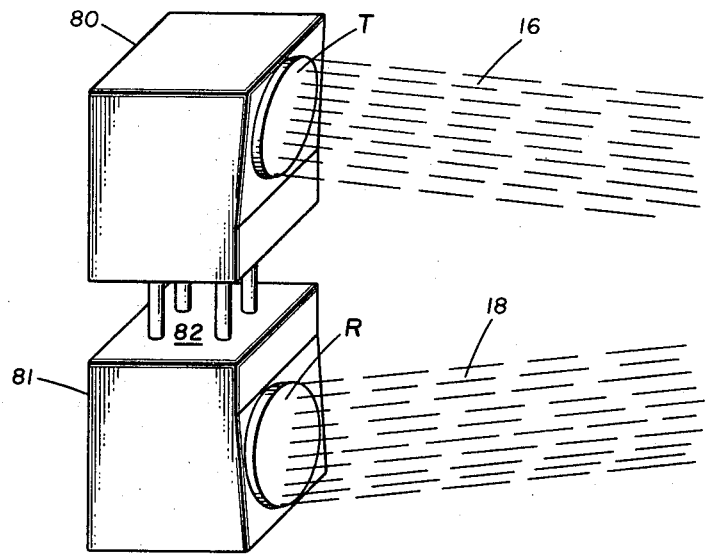
FIGURE 5 illustrates an oblique view of a transducer assembly suitable for use in my invention.

A suitable transducer assembly for use in the system of FIGURE 2 is illustrated in FIGURE 5 where the transmitter T and the receiver R are two disk-shaped crystals. Crystals T and R may be lead zirconate titanate, available from the Clevite Corporation, Bedford, Ohio. The crystals are each glued to a transducer block 80 and 81 which may be composed of some material which matches the acoustic impedance of the crystals T and R, such as lead or aluminum. The size found suitable for the crystals T and R is about one-half inch diameter and about .05 inch thickness. With these dimensions, the transmitted beam of acoustic pulses 16 is sharply focused into a slender, cylindrical shaft with negligible divergence. For example, with the frequencies in the example given above, the diameter of the transmitted beam 16 will be about .6 inch, two inches away from transmitting crystal T.

Since the transmitted beam 16 is focused for a fixed distance away, means are provided for changing the focusing distance for different length paths, i.e., different diameter boreholes. Four rods 82, secured by set screws in the transducer blocks 80 and 81, separate the two transducer blocks at any desired distance. Changing the separation of the crystals T and R results in changing the focusing distance of the transmitted beam 16 and received beam 18. In one embodiment suitable for use in the invention, crystals T and R were 1.1 inches apart and the angle between the transmitted beam 16 and the received beam 18 was about 30°.

While my invention has been described with reference to a separate transmitter and receiver, it will, of course, be understood that a single transceiver could be used with suitable switching circuitry.

As an alternate embodiment of the invention, the peak-reading voltage circuit 36 (FIGURE 2) may be eliminated. The output of the gate 66 may be applied directly to the averaging circuit 38 so that the averaging process is responsive to both the peak amplitude of each reflected pulse as well as the width of each pulse.

In light of the foregoing description of certain specific embodiments of my invention, it will become apparent to those skilled in the art that there can be still further modifications to the invention. It is intended to cover all such modifications as fall within the spirit and scope of the appended claims.

I claim:

1. A method of determining the characteristic properties of formations adjacent a borehole comprising the steps of:
 (a) directing a beam of high frequency energy toward the walls of said borehole in a circular scanning pattern along the length thereof,
 (b) receiving direct reflections of said beam from the walls of said borehole,
 (c) generating a signal representative of the average amplitude of the reflections received during at least one complete circular scanning of the wall of the borehole, and
 (d) recording said signal as a function of depth.

2. A method as in claim 1 wherein step (c) includes generating a signal representative of the average of the peak amplitudes of each reflection received during at least one complete circular scanning of the wall of the borehole.

3. A method as in claim 1 wherein the averaging is performed for reflections received over at least three complete circular scannings of the wall of the borehole.

4. A system for logging characteristics of formations adjacent a borehole comprising:
 (a) a transducer assembly including a transmitter of a beam of repetitive ultrasonic pulses and a receiver of ultrasonic pulses,
 (b) means for rotating said transducer assembly about the borehole axis so that said transmitter directs said beam toward the walls of said borehole and said receiver detects pulses reflected directly from said walls,
 (c) means for moving said transducer assembly along the length of said borehole,
 (d) means responsive to said detected pulses for generating a signal representative of the average amplitude of the pulses detected during at least one revolution of said transducer assembly, and
 (e) means for recording said signal as a function of depth.

5. A system as in claim 4 wherein said means of element (d) includes means for generating a signal representative of the average of the peak amplitudes of each pulse detected during at least one revolution of the transducer assembly.

6. A system as in claim 4 wherein said means of element (d) includes an integrator circuit comprising a resistor and a capacitor.

7. A system as in claim 6 wherein said integrator circuit has an RC constant which is about three times the period of revolution of said transducer assembly.

8. A system for logging characteristics of formations adjacent a borehole comprising:
 (a) a transducer assembly including means for generating a beam of high frequency energy and receiving means for the high frequency energy,
 (b) means for rotating said transducer assembly about the borehole axis to direct said beam of high frequency energy toward walls of the formations traversed by the borehole,
 (c) means for moving said transducer assembly along the length of the borehole,
 (d) detector means downhole responsive to the output of said receiving means for generating a signal representative of at least a portion of the envelope of energy reflected from the formations and received at said receiving means,
 (e) means responsive to the output of said detector for generating a signal representative of the average amplitude of the peak values of the output of said detector during at least one revolution of said transducer assembly, and
 (f) means for recording said average signal as a function of depth of said transducer assembly in the borehole.

References Cited

UNITED STATES PATENTS

| | | | |
|---|---|---|---|
| 2,595,241 | 5/1952 | Goble | 181—.5 X |
| 2,631,270 | 3/1953 | Goble | 340—18 X |
| 2,648,056 | 8/1953 | Jakosky | 340—18 |
| 2,694,461 | 11/1954 | Martin | 181—.5 |
| 2,813,590 | 11/1957 | McDonald | 181—.5 |
| 2,825,044 | 2/1958 | Peterson | 340—18 |
| 3,205,941 | 9/1965 | Walker | 181—.5 X |
| 3,289,156 | 11/1966 | Wilson | 181—.5 X |
| 3,292,143 | 12/1966 | Russell | 181—.5 X |
| 3,309,658 | 3/1967 | Summers | 181—.5 X |
| 3,314,498 | 4/1967 | Anderson et al. | 181—.5 |

BENJAMIN A. BORCHELT, *Primary Examiner.*

R. M. SKOLNIK, *Assistant Examiner.*